(12) United States Patent
Reuther

(10) Patent No.: US 11,124,010 B2
(45) Date of Patent: Sep. 21, 2021

(54) METHOD AND DEVICE FOR PRODUCING A MULTILAYER FILM

(71) Applicant: LEONHARD KURZ Stiftung & Co. KG, Furth (DE)

(72) Inventor: Uwe Reuther, Nuremberg (DE)

(73) Assignee: LEONHARD KURZ STIFTUNG & CO. KG, Furth (DE)

( * ) Notice: Subject to any disclaimer, the term of this patent is extended or adjusted under 35 U.S.C. 154(b) by 0 days.

(21) Appl. No.: 15/750,021

(22) PCT Filed: Aug. 3, 2016

(86) PCT No.: PCT/EP2016/068571
§ 371 (c)(1),
(2) Date: Feb. 2, 2018

(87) PCT Pub. No.: WO2017/021461
PCT Pub. Date: Feb. 9, 2017

(65) Prior Publication Data
US 2018/0215190 A1 Aug. 2, 2018

(30) Foreign Application Priority Data
Aug. 5, 2015 (DE) .......................... 102015112909.4

(51) Int. Cl.
*B42D 25/47* (2014.01)
*B32B 27/30* (2006.01)
(Continued)

(52) U.S. Cl.
CPC ................ *B42D 25/47* (2014.10); *B32B 3/10* (2013.01); *B32B 7/06* (2013.01); *B32B 7/12* (2013.01);
(Continued)

(58) Field of Classification Search
CPC ..... B32B 15/08; B32B 15/082; B32B 15/085; B32B 15/09; B32B 15/20; B32B 2250/02;
(Continued)

(56) References Cited

U.S. PATENT DOCUMENTS 4,640,727 A * 2/1987 Janssen ................. B44C 1/1733
156/240
4,919,994 A * 4/1990 Incremona ............ B44C 1/1733
428/141
(Continued)

FOREIGN PATENT DOCUMENTS

DE 293251 8/1915
DE 10013410 9/2001
(Continued)

OTHER PUBLICATIONS

Written Opinion of PCT/EP2016/068571.*
(Continued)

*Primary Examiner* — Sonya M Sengupta
(74) *Attorney, Agent, or Firm* — Hoffmann & Baron, LLP

(57) ABSTRACT

A method for producing a multilayer film, with the steps:
a) providing a base body with a carrier ply and a transfer ply, which comprises at least one layer;
b) applying an in particular UV-curable adhesive to at least one partial area of the transfer ply of the base body;
c) applying a stamping foil which comprises a carrier ply and a transfer ply, with the result that the transfer ply of the stamping foil comes into contact with the transfer ply of the base body coated with adhesive;
d) curing the adhesive by UV irradiation;
e) removing the carrier ply of the stamping foil.

55 Claims, 4 Drawing Sheets

(51) Int. Cl.

| | | |
|---|---|---|
| *B32B 3/10* | (2006.01) | |
| *B32B 27/28* | (2006.01) | |
| *B32B 7/12* | (2006.01) | |
| *B32B 7/06* | (2019.01) | |
| *B32B 37/00* | (2006.01) | |
| *B32B 27/40* | (2006.01) | |
| *B32B 15/20* | (2006.01) | |
| *B32B 37/12* | (2006.01) | |
| *B32B 15/08* | (2006.01) | |
| *B32B 27/16* | (2006.01) | |
| *B32B 27/32* | (2006.01) | |
| *B32B 27/36* | (2006.01) | |
| *B44C 1/17* | (2006.01) | |
| *B42D 25/364* | (2014.01) | |
| *B42D 25/373* | (2014.01) | |
| *B32B 15/082* | (2006.01) | |
| *B32B 7/14* | (2006.01) | |
| *B42D 25/378* | (2014.01) | |
| *B32B 15/09* | (2006.01) | |
| *B32B 15/085* | (2006.01) | |
| *B44C 3/00* | (2006.01) | |
| *B42D 25/29* | (2014.01) | |
| *B42D 25/328* | (2014.01) | |
| *B42D 25/387* | (2014.01) | |
| *B32B 38/10* | (2006.01) | |
| *B44C 1/16* | (2006.01) | |
| *B32B 38/06* | (2006.01) | |
| *B41M 3/12* | (2006.01) | |
| *B44C 3/02* | (2006.01) | |

(52) U.S. Cl.
CPC .............. *B32B 7/14* (2013.01); *B32B 15/08* (2013.01); *B32B 15/082* (2013.01); *B32B 15/085* (2013.01); *B32B 15/09* (2013.01); *B32B 15/20* (2013.01); *B32B 27/16* (2013.01); *B32B 27/28* (2013.01); *B32B 27/281* (2013.01); *B32B 27/30* (2013.01); *B32B 27/302* (2013.01); *B32B 27/304* (2013.01); *B32B 27/308* (2013.01); *B32B 27/32* (2013.01); *B32B 27/36* (2013.01); *B32B 27/40* (2013.01); *B32B 37/00* (2013.01); *B32B 37/025* (2013.01); *B32B 37/1292* (2013.01); *B32B 38/10* (2013.01); *B42D 25/29* (2014.10); *B42D 25/328* (2014.10); *B42D 25/364* (2014.10); *B42D 25/373* (2014.10); *B42D 25/378* (2014.10); *B42D 25/387* (2014.10); *B44C 1/162* (2013.01); *B44C 1/1733* (2013.01); *B44C 3/005* (2013.01); *B32B 38/06* (2013.01); *B32B 2250/02* (2013.01); *B32B 2250/44* (2013.01); *B32B 2255/10* (2013.01); *B32B 2255/26* (2013.01); *B32B 2305/347* (2013.01); *B32B 2307/40* (2013.01); *B32B 2307/4026* (2013.01); *B32B 2307/748* (2013.01); *B32B 2310/0831* (2013.01); *B32B 2425/00* (2013.01); *B32B 2451/00* (2013.01); *B32B 2457/00* (2013.01); *B41M 3/12* (2013.01); *B44C 3/02* (2013.01)

(58) Field of Classification Search
CPC ............ B32B 2250/44; B32B 2255/10; B32B 2255/26; B32B 2305/347; B32B 2307/40; B32B 2307/4026; B32B 2307/748; B32B 2310/0831; B32B 2425/00; B32B 2451/00; B32B 2457/00; B32B 27/16; B32B 27/28; B32B 27/281; B32B 27/30; B32B 27/302; B32B 27/304; B32B 27/308; B32B 27/32; B32B 27/36; B32B 27/40; B32B 37/00; B32B 37/025; B32B 37/1292; B32B 38/06; B32B 38/10; B32B 3/10; B32B 7/06; B32B 7/12; B32B 7/14; B41M 3/12; B42D 25/29; B42D 25/328; B42D 25/364; B42D 25/373; B42D 25/378; B42D 25/387; B42D 25/47; B44C 3/005; B44C 3/02

USPC .......................................................... 156/235
See application file for complete search history.

(56) References Cited

U.S. PATENT DOCUMENTS

| | | | | |
|---|---|---|---|---|
| 5,807,456 | A * | 9/1998 | Kaule | B41M 3/14 |
| | | | | 156/219 |
| 5,928,456 | A * | 7/1999 | Souparis | G03H 1/0252 |
| | | | | 156/285 |
| 6,544,369 | B1* | 4/2003 | Kitamura | B32B 15/08 |
| | | | | 156/230 |
| 6,689,319 | B1* | 2/2004 | Fisher | B01J 19/0046 |
| | | | | 422/400 |
| 8,932,425 | B2 | 1/2015 | Lutz et al. | |
| 2003/0175047 | A1* | 9/2003 | Baker, Jr. | G03G 15/6585 |
| | | | | 399/222 |
| 2004/0053001 | A1* | 3/2004 | Abrams | B29C 45/14811 |
| | | | | 428/90 |
| 2004/0081807 | A1* | 4/2004 | Bonkowski | G03H 1/02 |
| | | | | 428/195.1 |
| 2005/0167035 | A1 | 8/2005 | Laskey et al. | |
| 2005/0170259 | A1* | 8/2005 | Holmes | B42D 25/328 |
| | | | | 430/1 |
| 2005/0266204 | A1* | 12/2005 | Abrams | D06P 5/004 |
| | | | | 428/90 |
| 2006/0262367 | A1* | 11/2006 | Hattori | B41M 3/14 |
| | | | | 359/15 |
| 2007/0166518 | A1 | 7/2007 | Brehm | |
| 2008/0308150 | A1* | 12/2008 | Schindler | H01L 31/022425 |
| | | | | 136/256 |
| 2008/0311330 | A1 | 12/2008 | Schindler | |
| 2009/0250158 | A1* | 10/2009 | Streb | B32B 38/10 |
| | | | | 156/219 |
| 2010/0212821 | A1* | 8/2010 | Grinberg | B32B 37/0046 |
| | | | | 156/247 |
| 2011/0210468 | A1* | 9/2011 | Shannon | G03F 7/0002 |
| | | | | 264/139 |
| 2012/0156445 | A1* | 6/2012 | Schmidt | B29C 45/14811 |
| | | | | 428/195.1 |
| 2013/0134698 | A1* | 5/2013 | Mayrhofer | G09F 3/0292 |
| | | | | 283/81 |
| 2015/0145936 | A1* | 5/2015 | Plaia | B42D 25/373 |
| | | | | 347/102 |
| 2016/0185150 | A1* | 6/2016 | Brehm | B42D 25/378 |
| | | | | 283/94 |
| 2017/0267013 | A1 | 9/2017 | Staub et al. | |
| 2018/0111406 | A1* | 4/2018 | Loginov | G07D 7/003 |

FOREIGN PATENT DOCUMENTS

| | | |
|---|---|---|
| DE | 102010025278 | 12/2011 |
| DE | 102014112073 | 2/2016 |
| EP | 2163394 | 3/2010 |
| JP | 2007520023 A | 7/2007 |
| JP | 2009010372 A | 1/2009 |
| JP | 2010066568 A | 3/2010 |
| JP | 2010231038 A | 10/2010 |
| JP | 2014050965 A | 3/2014 |
| JP | 2014124941 A | 7/2014 |
| WO | WO2007048563 | 5/2007 |
| WO | 2014207165 A1 | 12/2014 |

OTHER PUBLICATIONS

English translation of DE102010025278.*

(56) References Cited

OTHER PUBLICATIONS

English translation of WO2007/048563.*
Translation of EP2163394.*
Translation of Written Opinion of JP2018506116 (Year: 2020).*
Translation of amendment of claims of JP2018506116 (Year: 2021).*

* cited by examiner

US 11,124,010 B2

METHOD AND DEVICE FOR PRODUCING A MULTILAYER FILM

This application claims priority based on an International Application filed under the Patent Cooperation Treaty, PCT/EP2016/068571, filed Aug. 3, 2016, which claims priority to DE102015112909.4, filed Aug. 5, 2015.

BACKGROUND OF THE INVENTION

The invention relates to a method and a device for producing a multilayer film as well as a multilayer film that can be obtained in such a way.

Multilayer films have various uses in so-called "dry varnishing" or coating, in particular for the decoration of objects, in the production of security elements and the like. They are usually used in the form of transfer films which have a carrier ply and a transfer ply. The transfer ply is transferred to the object to be decorated, while the carrier ply is removed and discarded.

Partially metallized layers in which the metallization forms an optical design, an electrical function or the like are a frequently used decorative element in such films. Various methods are known for producing such partially metallized layers.

One production possibility is the printing of a transfer film with a water-soluble varnish, in particular with a high pigment content for an Increased porosity, a whole-surface vapor deposition with a thin metal layer and subsequent washing-off of the water-soluble varnish, wherein the metal remains on the film wherever no water-soluble varnish was printed.

Alternatively, it is also possible to vapor-deposit a transfer film with a thin metal layer over the whole surface and to print it with a varnish which provides resistance against an etch bath. The structuring of the metal layer is effected by subsequent chemical removal by etching of the metal layer in an etch bath, wherein the metal remains on the film wherever the resist varnish is printed.

A partial metallization can also be effected by means of UV illumination and photoresist. In this case a photoresist is printed onto the metal layer over the whole surface and illuminated using a mask. The mask can be present separately or can be part of the layer structure of the transfer film. Depending on the photoresist used (positive resist or negative resist), the resist is then removed in the illuminated or non-Illuminated areas and, in the other areas, acts as an etch resist, as described above.

These methods are subject to various limitations. In principle they can only be carried out "offline", i.e. the vapor deposition as well as the subsequent removal of the metal layer in each case have to be effected in a separate machine and the different process steps cannot be integrated into one printing line, for example.

If further, in particular dyed, decorative layers are to be applied, the position of the metal layer in the decorative structure is usually predefined, unless there is the possibility of arranging further decorative layers positionally accurate and register-accurate relative to the partial metallization. The terms "truing" or also "insetting" are also used here. In practice, with regard to the above-named known partial metallization methods, this means that in the wash-off method a partial metallization has to be applied after all other decorative layers registered relative to the partial metallization. A combination of a registered partial metallization in the etching method with further decorative varnish layers cannot be realized at all without the above-named insetting. If this possibility exists, the partial metallization usually lies in front of all other decorative layers, for practical reasons.

By register accuracy is meant a positional accuracy of two or more elements and/or layers relative to each other. The register accuracy is to vary within a predefined tolerance (register tolerance), which is to be as small as possible. At the same time, the register accuracy of several elements and/or layers relative to each other is an important feature in order to increase the protection against forgery. The positionally accurate positioning can be effected in particular by means of optically detectable registration marks or register marks. These registration marks or register marks can either represent special separate elements or areas or layers or themselves be part of the elements or areas or layers to be positioned. The term "perfect register" is used when the register tolerance is close to zero or is practically zero.

Economically worthwhile partial metallizations in the decorative area by means of etching methods additionally cannot be realized with all metals. For example, chromium is hardly suitable for such methods.

The often desired combination of a partial metallization with a semi-transparent or transparent color layer over the metal, for example to generate a green partially metallized area, is not easy to realize with the discussed methods without a register tolerance, conditional on process technology, or also a color overlap of the transparent Ink.

The combination of decorative layers which contain e.g. holographic elements with a partial metallization is to be implemented only with great difficulty technically with the discussed methods.

SUMMARY OF THE INVENTION

This object is achieved by a method according to claim 1, a device according to claim 40 and a multilayer film according to claim 47.

Such a method for producing a multilayer film comprises the steps:
a) providing a base body with a carrier ply and a transfer ply, which comprises at least one layer;
b) applying an in particular UV-curable adhesive to at least one first partial area of the transfer ply of the base body, wherein no adhesive is applied in at least one second partial area of the transfer ply;
c) applying a stamping foil which comprises a carrier ply and a transfer ply, with the result that the transfer ply of the stamping foil comes into contact with the adhesive deposited on the transfer ply of the base body in the at least one first partial area;
d) curing the adhesive by UV irradiation;
e) removing the carrier ply of the stamping foil.

To carry out such a method, a device for producing a multilayer film comprising the following is suitable:
 a supply roll for providing a stamping foil;
 a printing device for applying a radically curable adhesive to at least one partial area of a base body;
 a roller arrangement for pressing the stamping foil onto the base body;
 a UV light source, arranged downstream of the roller arrangement in the conveying direction of the films, for curing the adhesive by UV irradiation;
 a removal unit, arranged downstream of the UV light source in the conveying direction of the films, for removing a carrier ply of the stamping foil.

A multilayer film with a carrier ply and a transfer ply is thus obtained, wherein the transfer ply comprises a decorative ply in which there is provided at least one partial adhesive layer and one further partial layer, which is arranged registered relative to the partial adhesive layer. Such a multilayer film is suitable in particular for use as a hot-stamping foil, cold-stamping foil, laminating film, in-mold decoration film, deep-drawing film or the like.

In other words, the method utilizes a stamping transfer film to generate an area, shaped as desired and digitally predefined, on a further transfer film which represents the base body as a substrate. The transfer ply of the stamping foil remains on the base body only where the adhesive is applied.

The transfer ply of the stamping foil can in particular comprise a metallized layer. The metallized area generated can be positioned at any desired position (vertically in the layer structure and horizontally in the design) in the layer structure of the multilayer film.

The metallic area generated can be a closed metallic surface, but can also be interrupted by surfaces not covered with metal. These Interruptions or free spaces can be as small as the printing resolution of the applied adhesive layer allows. In particular, the metallic area can also be a metal grid with regularly or irregularly, very finely distributed grid elements, for example dots or lines. For example, a semi-transparency of the metallic area can thus be achieved.

The stamping foil can in principle be applied inline, thus within one printing line, and registered with other decorative layers. To produce a multilayer film, in terms of mechanical engineering, a device is conceivable which is formed as a mobile module, which can be used as required at any desired position of a multi-color printing machine. It is also possible to use several such mobile modules simultaneously at different positions or also several such mobile modules at the same position next to each other on one multi-color printing machine.

The transfer ply of the stamping foil, in particular thus a partial metallization, can be placed at any desired point in the decorative structure. Even several independent partially metallized areas in a multilayer film are conceivable, which can e.g. be dyed differently.

It is alternatively or additionally conceivable that one or more such mobile modules is/are used offline, thus on or during application of the multilayer film to any desired substrate. This means that the stamping foil is applied to a multilayer film to be applied, in particular immediately before application thereof. For example, features or motifs can thus be applied to the base body before the application of the multilayer film. These features or motifs can be individualized or personalized, or also formed uniformly. On application of the multilayer film, base body and stamping foil are thus brought together and so combined. This provides the advantage that, in terms of its structure and design, the multilayer film to be applied can easily be adapted to the customers' desires. The customer now no longer has to use a special, completely manufactured multilayer film in each case for different uses, which leads to his having to store a vast number of finished multilayer films. Instead, the customer can apply one or more stamping foils, corresponding to his desires and requirements, to the film to be applied or to the base body shortly before the application of the multilayer film to a substrate.

The one or more mobile modules can be formed as a separate device or devices, which can be arranged flexibly in the processing section of the multilayer film, for example immediately before and/or after the stamping station for the application of the multilayer film to a substrate.

The one or more mobile modules can also be formed as connectable integrated modules of the stamping station for the multilayer film.

The one or more mobile modules can apply the stamping foil to the multilayer film or to the base body, or alternatively or additionally can apply the stamping foil to the substrate. The application of the stamping foil to the substrate can be effected before and/or after the application of the multilayer film or the base body to the substrate.

The base body can be formed such that it could also be used, i.e. applied to a substrate, without the applied stamping foil as a functionalizable transfer film. Before application to a substrate, the stamping foil can now additionally be applied to the exposed transfer ply of the base body, in order to correspondingly supplement the already present layers of the base body.

Alternatively or additionally, the stamping foil can also be applied to the exposed top side of the base body, in particular to the exposed protective layer of the base body, after application to a substrate, in order to correspondingly supplement the already present layers of the base body.

It is also conceivable in principle that several stamping foils are applied. The stamping foils preferably differ from each other in their design. The stamping foils can be applied to the base body or the multilayer film to be applied inline and/or offline. It is also conceivable that the stamping foils are applied before application to a substrate and/or after application to a substrate.

The base body can, for example, have whole-surface or partial transparent and/or translucent layers and/or opaque layers, in particular in motif form or pattern form. The stamping foil can supplement these layers in that, for example, color layers and/or metal layers are applied in particular register-accurate or also not register-accurate relative to the already present layers.

These layers supplemented by the stamping foil can represent, for example, an individualization in the form of a code and/or a motif and/or a pattern on the base body or on the finished multilayer film, or also represent merely a flexibly usable component of the decoration of the multilayer film. This means that the base body can have, for example, a base constituent of a decoration in motif form and/or pattern form, which is supplemented or completed by a flexible constituent of the decoration in motif form and/or pattern form. Alternatively, the base body can have no decoration as yet, wherein the decoration is first applied by the layers of the stamping foil. The base body can, for example, have only one or more protective layers, to which the layers of the stamping foil are applied.

These layers supplemented by the stamping foil can represent, on the multilayer film, for example, a flexibly usable functionality of the multilayer film. This means that the base body has a base constituent of a function, for example an electrical or electronic function, which is supplemented or completed by a flexible constituent of the functionality. Alternatively, the base body can have no function as yet, wherein the function is first provided by the layers of the stamping foil. Examples of this are antennae, touch function elements, heating elements, constituents of display devices or displays, constituents of illumination elements, strip conductors and similar electrical functional elements.

When a stamping foil with a metal layer is used, a partial metallization with all metals with which a transfer ply metallized over the whole surface can be produced is possible.

A partial metallization can thus be dyed as desired, without an overlap of the transparent varnish layer being visible. Moreover, holographic effects can be integrated. The front and back side of the metallization can additionally be dyed differently.

The method is flexible, as the color and appearance of the metallization or other decorative layers combined therewith can be altered by simply changing the stamping foil.

It is preferred if a base body and a stamping foil are used which are formed such that a detachment force between the carrier ply of the stamping foil and the transfer ply of the stamping foil is lower than a detachment force between the carrier ply of the base body and the transfer ply of the base body. This makes it possible to detach the carrier ply of the stamping foil together with the unglued areas of the transfer ply of the stamping foil, without damaging the transferred layers or the layers of the base body.

It is advantageous if the detachment force between the carrier ply of the stamping foil and the transfer ply of the stamping foil is at least 15% lower, preferably at least 30% lower, than the detachment force between the carrier ply of the base body and the transfer ply of the base body. The detachment forces were determined with the aid of a tensile testing machine (Zwick Z005 from Zwick GmbH & Co. KG, Ulm). For this, the stamping foil or the base body was glued flat to the lower holder. The layer to be detached was then detached at right angles by the tensile test. The detachment forces were determined via the load cell.

In a further preferred embodiment, the adhesive is applied by screen printing or flexography. However, it is particularly preferred if the adhesive is applied by inkjet printing.

The structure of the transferred areas of the transfer ply of the stamping foil is generated digitally in the preferred case of inkjet printing during the application of the adhesive, with the result that the corresponding effects on the individual image plane can be individualized or personalized, or any desired changes in the shape of the metallized area are possible inline during the printing process.

For the application of the adhesive, an inkjet printhead with a resolution of from 300 to 1200 nozzles per inch (npi) is preferably used. A high-resolution deposition of the adhesive is hereby made possible, with the result that fine film structures can also be transferred with defined edges. As a rule, the resolution of the printhead corresponds to the achieved resolution of the adhesive droplets on the transfer ply in dpi (dots per inch).

It is furthermore preferred if, for the application of the adhesive, an inkjet printhead with a nozzle diameter of from 15 µm to 25 µm with a tolerance of no more than ±5 µm and/or a nozzle spacing of from 50 µm to 150 µm with a tolerance of no more than ±5 µm is used. The small nozzle spacing—in particular transverse to the printing direction—ensures that the transferred adhesive droplets on the transfer ply lie sufficiently close to each other or optionally even overlap, with the result that a good adhesion is achieved over the whole printed surface.

It is furthermore preferred if the adhesive is applied to the at least one partial area with a weight per unit area of from 0.5 g/m² to 20 g/m² and/or a layer thickness of from 0.5 µm to 20 µm, preferably from 1 µm to 15 µm. Within this area, which guarantees a good adhesion, the deposited quantity or layer thickness of the adhesive can be varied depending on the base body used, in particular on the absorbency thereof, in order to further optimize the application result.

It is expedient if adhesive droplets are provided by the inkjet printhead with a frequency of from 6 kHz to 110 kHz. At usual conveying speeds of the film to be printed of from 10 m/min to 30 m/min, the desired resolution of from 360 dpi to 1200 dpi can thus be achieved in the conveying direction.

Adhesive droplets with a volume of from 2 pl to 50 pl with a tolerance of no more than ±6% are preferably provided by the inkjet printhead. With the described depositing resolutions and depositing speeds, the necessary quantity of adhesive is thus applied to the transfer ply uniformly.

It is preferred if adhesive droplets are provided by the inkjet printhead with a flight speed of from 5 m/s to 10 m/s with a tolerance of no more than ±15%. The deflection of the adhesive droplets, in particular due to a draft during the transfer from the printhead to the transfer ply, is hereby minimized, with the result that the adhesive droplets land on the transfer ply in the desired defined arrangement.

It is further expedient if the adhesive is deposited on the transfer ply with a depositing temperature of from 40° C. to 45° C. and/or a viscosity of from 5 mPas to 20 mPas, preferably from 7 mPas to 15 mPas. The temperature control of the printhead ensures that the adhesive has the desired viscosity. In turn the pixel size and pixel shape of the adhesive applied to the transfer ply depend on the viscosity, wherein an optimum printability of the adhesive is guaranteed in the case of the specified values.

As soon as the adhesive leaves the printhead and comes into contact with the surrounding air or the transfer ply, a cooling occurs, through which the viscosity of the adhesive is increased. This counteracts a running or spreading of the transferred adhesive droplets.

It is further advantageous if a spacing between inkjet printhead and base body does not exceed 1 mm during the application of the adhesive. The influence of a draft on the adhesive is also reduced hereby.

A relative speed between inkjet printhead and base body during the application of the adhesive is preferably 10 m/min to 30 m/min.

At these speeds, in particular in combination with the above-specified parameters, the desired resolution of the adhesive printed on the transfer ply is achieved.

An adhesive with the following composition is preferably used here (percentages indicate percent by volume):

| | |
|---|---|
| 2-phenoxyethyl acrylate | 10% to 60%, preferably 25% to 50%; |
| 4-(1-oxo-2-propenyl)morpholine | 5% to 40%, preferably 10% to 25%; |
| exo-1,7,7-trimethylbicyclo[2.2.1]-hept-2-yl acrylate | 10% to 40%, preferably 20% to 25%; |
| 2,4,6-trimethylbenzoyldiphenyl phosphine oxide | 5% to 35%, preferably 10% to 25%; |
| dipropylene glycol diacrylate | 1% to 20%, preferably 3% to 10%; |
| urethane acrylate oligomer | 1% to 20%, preferably 1% to 10%. |

Such a formulation guarantees the desired properties, in particular the rapid curing and a viscosity which makes a good printability possible with at the same time a stable and well-focused depositing.

It is expedient if an adhesive with a density of from 1 g/ml to 1.5 g/ml, preferably from 1.0 g/ml to 1.1 g/ml, is used.

It is advantageous in particular if the adhesive is applied in the form of an item of optically perceptible information, in particular in the form of an individualization feature.

Almost any desired designs can hereby be realized, which can be adapted individually to the duration of the method. Thus, for example, security elements can be provided with serial numbers, information on the object to be protected, information about the holder or the like.

It is advantageous if the adhesive is applied in a predefined relative positional relationship, i.e. In particular registered relative to a further item of optically perceptible information which is formed by the transfer ply of the base body.

The designs formed by the transferred areas of the transfer ply of the stamping foil can thus be applied register-accurate relative to designs already present in the transfer ply of the base body. Either the designs of the base body itself can be used to control the register-accurate adhesive depositing or special register marks or registration marks can be applied to the base body.

It is expedient if, before the application of the adhesive, a position of the further item of optically perceptible information is detected by means of a camera, in particular a line scan camera, and the adhesive depositing is controlled depending on the detected position.

Slight positional shifts of the designs in the base body can also be compensated for hereby, with the result that a registered depositing always results.

It is further preferred if the adhesive is pre-cured before the application of the stamping foil.

The pre-curing of the adhesive improves the depositing quality further. In particular, the viscosity of the adhesive is increased hereby, before the transfer ply of the stamping foil is pressed onto the base body in the roller arrangement. This prevents a running or too much pinching of the applied adhesive pixels during the transfer, with the result that an application of the transfer ply of the stamping foil to the base body with particularly defined edges and a particularly high surface quality of the transferred layers is achieved. A slight pinching of the adhesive pixels is actually desirable, in order to bring directly adjacent adhesive pixels closer to each other and combine them. This can be advantageous in order, for example, in the case of closed surfaces and/or at the edges of motifs, to prevent a pixelation of the representation, i.e. to prevent individual pixels from appearing in an optically disruptive manner. The pinching must take place only to the extent that the desired resolution is not too greatly reduced.

The pre-curing of the adhesive is preferably effected 0.02 s to 0.025 s after the application of the adhesive. Due to the pre-curing, the adhesive is hereby fixed to the transfer ply of the base body very quickly after the printing, with the result that a running or spreading of the adhesive droplets is largely avoided and the high printing resolution is preserved as well as possible.

It is expedient if the pre-curing of the adhesive is effected with UV light, the energy of which is at least 90% radiated in the wavelength range between 380 nm and 420 nm. At these wavelengths, in particular in the case of the above-mentioned adhesive formulations, the radical curing is reliably initiated.

It is further advantageous if the pre-curing of the adhesive is effected with a gross irradiance of from 2 $W/cm^2$ to 5 $W/cm^2$ and/or a net irradiance of from 0.7 $W/cm^2$ to 2 $W/cm^2$ and/or an energy input into the adhesive of from 8 $mJ/cm^2$ to 112 $mJ/cm^2$. It is hereby achieved that the adhesive undergoes the desired increase in viscosity, but is not completely cured, with the result that the necessary adhesive action of the adhesive is preserved during the application of the transfer ply of the stamping foil to the base body.

The pre-curing of the adhesive is preferably effected with an illumination time of from 0.02 s to 0.056 s. In the case of the mentioned transport speeds of the base body and the specified irradiances, the necessary energy input for the pre-curing is thus ensured.

It is expedient if, during the pre-curing of the adhesive, the viscosity thereof increases to from 50 mPas to 200 mPas. Such an increase in viscosity guarantees that the adhesive droplets are not pinched during the application of the transfer ply to the base body, with the result that the transfer ply of the stamping foil can be substantially transferred to the base body with the resolution achieved during the printing of the adhesive.

The application of the transfer ply of the stamping foil to the partial area of the base body provided with adhesive is preferably effected between a pressure roller and a counter-pressure roller. A linear compression that is constant over the entire width of the base body, and thus a uniform and high-quality application of the transfer ply, is hereby achieved.

It is expedient if the application of the stamping foil to the base body is effected with a contact pressure of from 10 N to 80 N. The contact pressure can be varied within this range in order to adapt the method to the nature of the substrate and to prevent damage to or deformation of the base body or the transfer ply of the stamping foil.

The application of the stamping foil to the base body is advantageously effected 0.2 s to 1.7 s after the pre-curing of the adhesive. In this period of time, the pre-curing reaction can proceed without an excessive curing of the adhesive being effected, which could impair the adhesion.

The curing of the adhesive is preferably effected 0.2 s to 1.7 s after the application of the transfer ply of the stamping foil to the base body. At the usual transport speeds of the films, a sufficient spatial distance between the roller arrangement and the curing station is thus ensured.

It is expedient if the curing of the adhesive is effected with UV light, the energy of which is at least 90% radiated in the wavelength range between 380 nm and 420 nm. At these wavelengths, in particular in the case of the above-mentioned adhesive formulations, the radical curing is reliably set in motion.

It is furthermore preferred if the curing of the adhesive is effected with a gross irradiance of from 12 $W/cm^2$ to 20 $W/cm^2$ and/or a net Irradiance of from 4.8 $W/cm^2$ to 8 $W/cm^2$ and/or an energy input into the adhesive of from 200 $mJ/cm^2$ to 900 $mJ/cm^2$, preferably from 200 $mJ/cm^2$ to 400 $mJ/cm^2$. In the case of such an energy input, a reliable full cure of the adhesive is achieved, with the result that, after the curing step, the carrier ply of the stamping foil can be removed without damaging the applied transfer ply.

It is furthermore advantageous if the curing of the adhesive is effected with an illumination time of from 0.04 s to 0.112 s. In the case of the specified gross irradiances and the usual transport speeds, the necessary net energy input for the full cure of the adhesive Is thus ensured.

It is furthermore preferred if the detachment of the carrier ply is effected 0.2 s to 1.7 s after the curing of the adhesive. In the case of the usual transport speeds of the films, a sufficient spatial distance between the curing station and the detachment station is thus ensured.

A base body and/or a stamping foil is preferably used which has a carrier ply made of polyester, polyolefin, polyvinyl, polyimide, ABS, PET, PC, PP, PE, PVC or PS with a layer thickness of from 3 µm to 100 µm, preferably from 7 µm to 23 µm. The carrier ply protects and stabilizes the transfer ply during the production, storage and processing of the films. If, during the pre- or full curing of the adhesive, illumination is to be effected from the side of the carrier ply with UV light, the material selection is to be targeted at the corresponding transparency of the carrier ply in the illumination wavelength range.

It is further expedient if a base body and/or a stamping foil is used the carrier ply of which has a detachment layer made of acrylate copolymer, in particular of an aqueous polyurethane copolymer, and preferably free from wax and/or free from silicone, with a layer thickness of from 0.01 μm to 2 μm, preferably from 0.1 μm to 0.5 μm, which is arranged on a surface of the carrier ply. The detachment layer makes a simple and damage-free detachment of the carrier ply from the transfer ply possible after application thereof to the substrate.

It is further preferred if a base body and/or a stamping foil is used the transfer ply of which has a varnish layer made of nitrocellulose, polyacrylate and polyurethane copolymer with a layer thickness of from 0.1 μm to 5 μm, preferably from 1 μm to 2 μm. The varnish layer can be transparent, translucent or transparently dyed, or opaquely dyed.

The varnish layer preferably comprises at least one colorant, in particular colored or achromatic pigments and/or effect pigments, thin-film layer systems, cholesteric liquid crystals, dyes and/or metallic or non-metallic nanoparticles.

It is further preferred if a base body and/or a stamping foil is used the transfer ply of which comprises at least one replication layer, in particular made of polyacrylate, polyester acrylate, polyurethanes and copolymers thereof, into which a surface relief is introduced which forms an optically variable element, in particular a hologram, Kinegram@ or Trustseal®, a preferably linear or crossed sinusoidal diffraction grating, a linear or crossed single- or multi-step rectangular grating, a zero-order diffraction structure, an asymmetrical relief structure, a blazed grating, a preferably isotropic or anisotropic mat structure, or a light-diffracting and/or light-refracting and/or light-focusing micro- or nanostructure, a binary or continuous Fresnel lens, a binary or continuous Fresnel freeform surface, a microprism structure or a combined structure thereof.

Various appealing optical effects can be realized hereby which are particularly difficult to imitate and manipulate.

Furthermore, a base body and/or a stamping foil is preferably used the transfer ply of which has a metal layer made of aluminum and/or chromium and/or silver and/or gold and/or copper with a layer thickness of from 10 nm to 200 nm, preferably from 10 nm to 50 nm.

As an alternative or in addition to the metal layer, a layer made of an HRI material (HRI=High Refractive index) can also be provided. HRI materials are, for example, metal oxides such as ZnS, $TiO_x$ or also varnishes with corresponding nanoparticles.

Both the varnish layer and the metal layer generate the desired decorative effect of the transfer ply after their transfer to the base body. By the combination of different varnishes and metals, particularly appealing designs can be realized.

It is particularly advantageous if a base body and/or a stamping foil is used the transfer ply of which has a primer layer made of polyacrylates and/or vinyl acetate copolymers with a layer thickness of from 0.1 μm to 1.5 μm, preferably from 0.5 μm to 0.8 μm. The primer layer can be optimized in terms of their physical and chemical properties with respect to the adhesive used, with the result that an optimum adhesion between substrate and transfer ply is guaranteed as far as possible independently of the substrate. Furthermore, a primer layer optimized in such a way guarantees that the deposited adhesive remains on the transfer ply in the desired resolution largely without running, spreading or pinching.

It is expedient in particular if the primer layer is microporous and in particular has a surface roughness in the range of from 100 nm to 180 nm, in particular in the range of from 120 nm to 160 nm. The adhesive can partially penetrate such a layer and is thereby particularly well fixed in high resolution.

It has proved to be particularly favorable that a primer layer is used with a pigmentation rate of from 1.5 $cm^3$/g to 120 $cm^3$/g, in particular in the range of from 10 $cm^3$/g to 20 $cm^3$/g.

For the calculation, the composition of a primer layer is specified below (data in grams):
4900 organic solvent ethyl alcohol
150 organic solvent toluene
2400 organic solvent acetone
600 organic solvent gasoline 80/110
150 water
120 binder I: ethyl methacrylate polymer
250 binder II: vinyl acetate homopolymer
500 binder III: vinyl acetate vinyl laurate copolymer, solids=50+/−1%
400 binder IV: isobutyl methacrylate
20 pigment multi-functional silicon oxide, average particle size 3 μm
5 filler micronized amide wax, particle size 3 μm to 8 μm The pigmentation rate for this adhesive layer is as follows:

$$PR = \sum_1^x \frac{(m_P \times f)_x}{(m_B + m_d)} = \frac{20 \text{ g} \times 750}{1020 \text{ g} + 0 \text{ g}} = 14.7 \text{ cm}^3/\text{g}$$

with:
mp=20 g multi-functional silica
f=OAV/d=300/0.4 g/$cm^3$=750 cm/g for multi-functional silicon oxide (OAV=oil absorption value)
$m_B$=120 g binder I+250 g binder II+(0.5×500 g) binder III+400 g binder IV=1020 g
$m_A$=0 g In this way, starting from a composition of the primer layer found to be good, further possible pigmentations deviating from this can be generated quickly and in an uncomplicated manner.

It is furthermore expedient if the primer layer has a surface tension of from 38 mN/m to 46 mN/m, preferably from 41 mN/m to 43 mN/m. Such surface tensions allow adhesive droplets, in particular from adhesive systems as described above, to adhere with a defined geometry on the surface without running.

In total, all of the named layers can be integrated into the structure of the transfer plies of base body and stamping foil in any desired combination, number and sequence, with the result that various designs are possible. All the layers can be partially present and, for example, form motifs and designs by themselves or in combination with further layers.

The device advantageously has a further supply roll for providing the base body of the multilayer film. The printing device for applying a radically curable adhesive to at least one partial area of the base body is preferably arranged downstream of the further supply roll in the conveying direction of the base body.

The device preferably has at least one means for guiding the base body. The guide means ensure in particular that the base body is conveyed to the printing equipment and/or the roller arrangement in the desired alignment. The guide means can be arranged next to or also as an alternative to the further supply roll.

It is further preferred if a first image-acquisition device for detecting an optical feature of the base body is arranged upstream of the printing device in the conveying direction of the base body and is connected to the printing device via a control unit for controlling the printing device.

As already explained, the adhesive depositing can thus be controlled exactly, in order to guarantee a register-accurate arrangement of the transferred transfer ply of the stamping foil relative to existing design features of the base body.

Furthermore it is preferred if the roller arrangement comprises a pressure roller and a counter-pressure roller, which is adjustable relative to the pressure roller to set a clearance of the roller arrangement.

The clearance setting can control how strongly deposited adhesive dots are pinched and thus what pixel size ultimately results.

It is advantageous if a second image-acquisition device for detecting an optical feature of the multilayer film is arranged downstream of the removal device in the conveying direction of the base body and is connected to the roller arrangement via a control unit for controlling the clearance.

The second image-acquisition device is preferably likewise a line scan camera. It is used for quality control. If, via the second image-acquisition device, it is established that the adhesive pixels are pinched too much or too little, the clearance can be adjusted, with the result that the desired resolution is again achieved.

Furthermore it is advantageous if the device is designed as a module which can be integrated into a printing line with at least one printing unit.

This makes it possible to decorate the base body inline with further printing steps which can be effected before or after the depositing of the transfer ply of the stamping foil.

BRIEF DESCRIPTION OF THE DRAWINGS

The invention is now explained in more detail with reference to embodiment examples. There are shown in.

DETAILED DESCRIPTION OF THE PREFERRED EMBODIMENTS

Figure 1:
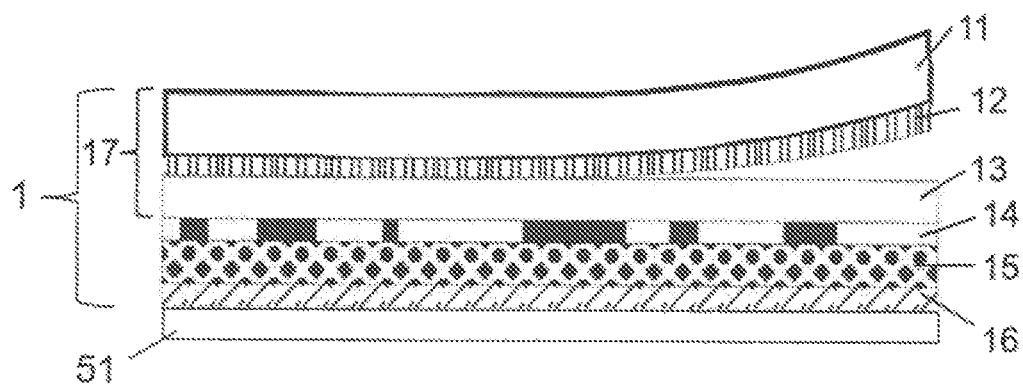
FIG. 1 a schematic sectional representation through an embodiment example of a multilayer film.

FIG. 1 shows a multilayer film 1, which can be used for the decoration of objects, for the application of security elements and the like.

The multilayer film 1 comprises a carrier ply 11, a detachment layer 12, a protective varnish layer 13, which can itself be multilayered, a decorative ply 14, which can itself be multilayered, a further varnish layer 15 and a primer 16, which can itself be multilayered and acts as an adhesive when the multilayer film is applied to a substrate 51.

The carrier ply 11 preferably consists of polyester, polyolefin, polyvinyl, polyimide, ABS, PET, PC, PP, PE, PVC or PS with a layer thickness of from 3 µm to 100 µm. The carrier ply 11 protects and stabilizes the further plies of the multilayer film 1 during the production, storage and processing of the film.

The detachment layer 12 is preferably formed from acrylate copolymer, in particular from an aqueous polyurethane copolymer, and preferably free from wax and/or free from silicone, with a layer thickness of from 0.01 µm to 2 µm, preferably from 0.1 µm to 0.5 µm, and arranged on a surface of the carrier ply 11.

The detachment layer 12 makes a simple and damage-free detachment of the carrier ply 11 from the further layers of the multilayer film 1 possible after application thereof to the substrate.

The protective varnish layer 13 preferably consists of nitrocellulose, polyacrylate and polyurethane copolymer with a layer thickness of from 0.1 µm to 5 µm, preferably from 1 µm to 2 µm, and is arranged on a surface of the detachment layer 12 facing away from the carrier ply 11. In particular, several layers made of these substance classes can be used.

The decorative ply 14 can be constructed multilayered. Among other things, the decorative ply 14 can comprise metal layers, layers made of high refractive index (HRI) materials, varnish layers and replication layers in any desired sequence and combination.

It is preferred if such a varnish layer has made of nitrocellulose, polyacrylate and polyurethane copolymer with a layer thickness of from 0.1 µm to 5 µm, preferably from 1 µm to 2 µm. The varnish layer can be transparent, translucent or transparently dyed, or opaquely dyed.

The varnish layer preferably comprises at least one colorant, in particular colored or achromatic pigments and/or effect pigments, thin-film layer systems, cholesteric liquid crystals, dyes and/or metallic or non-metallic nanoparticles.

Optionally present replication layers consist in particular of polyacrylate, polyester acrylate, polyurethanes and copolymers thereof, into which a surface relief is introduced which forms an optically variable element, in particular a hologram, Kinegram™ or Trustseal®, a preferably linear or crossed sinusoidal diffraction grating, a linear or crossed single- or multi-step rectangular grating, a zero-order diffraction structure, an asymmetrical relief structure, a blazed grating, a preferably isotropic or anisotropic mat structure, or a light-diffracting and/or light-refracting and/or light-focusing micro- or nanostructure, a binary or continuous Fresnel lens, a binary or continuous Fresnel freeform surface, a microprism structure or a combined structure thereof.

Various appealing optical effects can be realized hereby which are particularly difficult to imitate and manipulate.

Metal layers are generated, as a rule, by vapor deposition and preferably consist of aluminum and/or chromium and/or silver and/or gold and/or copper with a layer thickness of from 10 nm to 200 nm, preferably from 10 nm to 50 nm. Alternatively, the metal layer can also be applied from a varnish with metallic pigments and/or other metallic particles such as e.g. flakes by means of printing methods, in particular with a layer thickness of from 10 nm to 2000 nm.

As an alternative or in addition to the metal layer, a layer made of an HRI material (HRI=High Refractive Index) can also be provided. HRI materials are, for example, metal oxides such as ZnS, $TiO_x$ or also varnishes with corresponding nanoparticles.

Both the varnish layer and the metal layer generate the desired decorative effect of the decorative layer 14. Particularly appealing designs can be realized through the combination of different varnishes and metals.

The further varnish layer 15 is optional and corresponds, in terms of structure, to the varnish layer 13.

The primer layer 16 preferably consists of polyacrylates and/or vinyl acetate copolymers with a layer thickness of from 0.1 µm to 1.5 µm, preferably from 0.5 µm to 0.8 µm has. In general, however, any desired hot, cold or reactive adhesives can be used, which can be chosen depending on the substrate to be decorated. In particular, several layers made of these substance classes can be used.

In the production of the multilayer film 1, the detachment layer 12 and the protective varnish 13 are first applied to the carrier ply 11. Optionally, another one or more layers of the decorative ply 14 are also applied. Then at least one layer of the decorative ply 14, preferably a partial metal layer, is deposited by stamping a cold-stamping foil 2 and then the following layers in the layer structure are generated, for example by printing.

Figure 2:
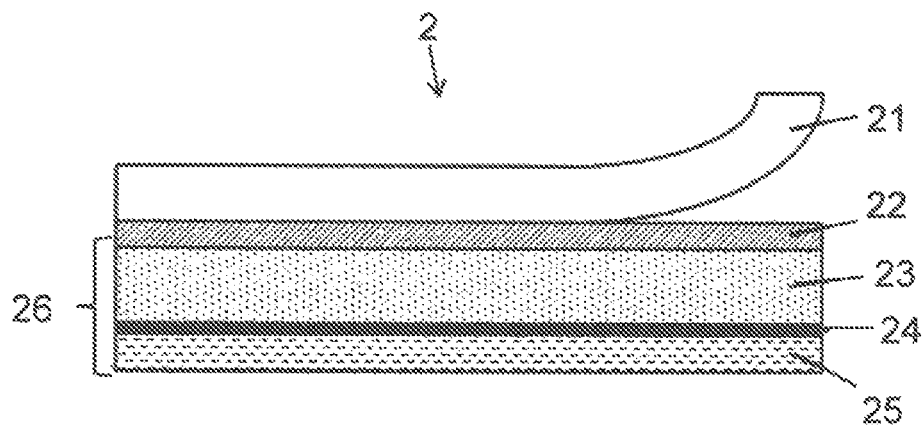
FIG. 2 a schematic sectional representation through a stamping foil for decorating a base body of a multilayer film.

An embodiment example of a cold-stamping foil 2 that can be used for this is shown in FIG. 2. It comprises a carrier ply 21, a detachment layer 22, a protective varnish layer 23, a whole-surface metal layer 24 and a primer layer 25.

The carrier ply 21, detachment layer 22, protective varnish layer 23 and primer layer 25 correspond, in terms of their composition, to the carrier ply 11, detachment layer 12, protective varnish layer 13 and primer layer 16 of the multilayer film 1. However, it is to be noted that the detachment force of the detachment layer 12 must be greater than the detachment force of the detachment layer 22.

The metal layer 24 is generated by whole-surface vapor deposition or sputtering and preferably consists of aluminum and/or chromium and/or silver and/or gold and/or copper with a layer thickness of from 10 nm to 200 nm, preferably from 10 nm to 50 nm. Alternatively, the metal layer can also be applied from a varnish with metallic pigments and/or other metallic particles such as e.g. flakes by means of printing methods, in particular with a layer thickness of from 10 nm to 2000 nm.

Figure 3:
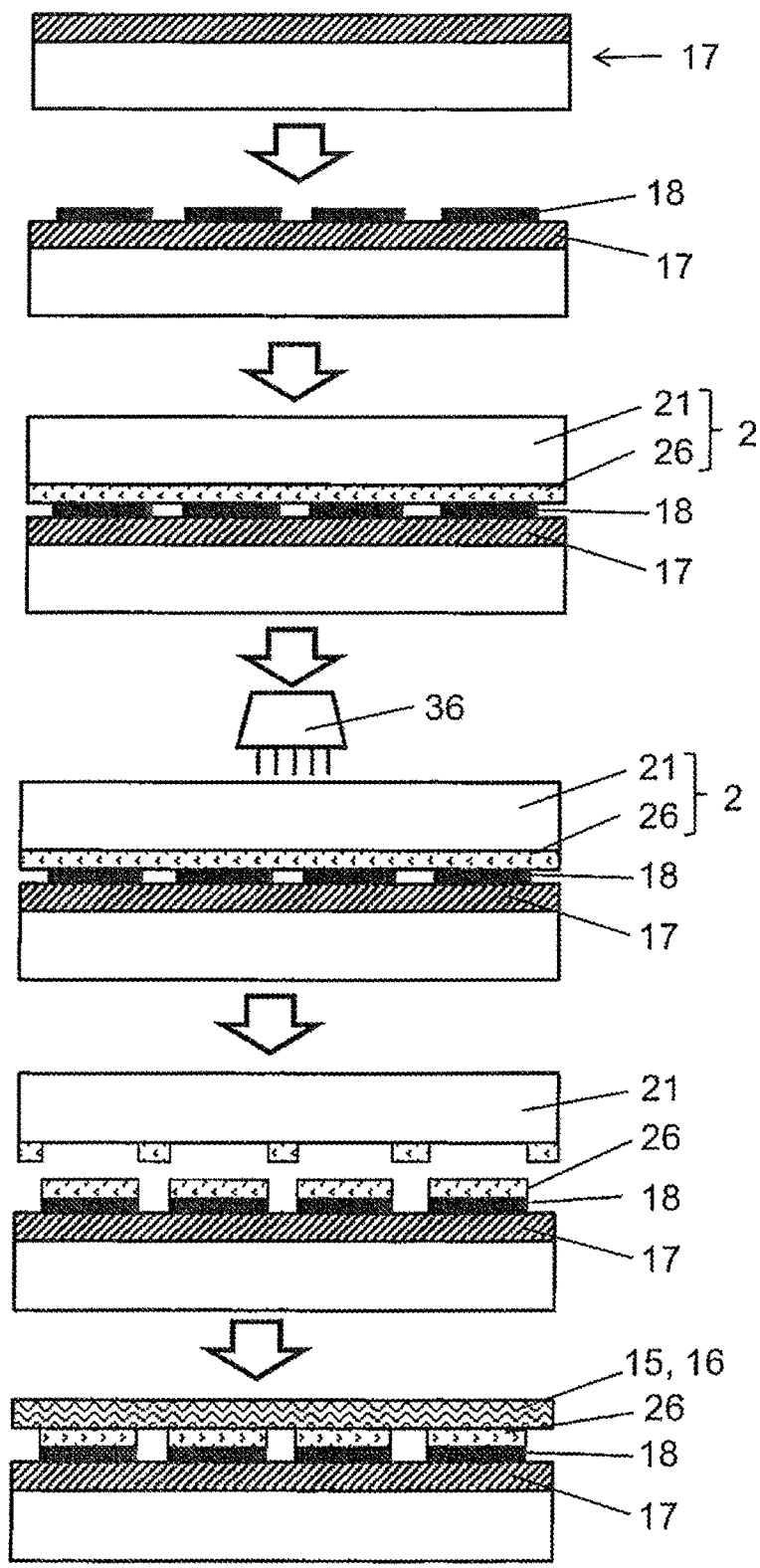
FIG. 3 a schematic representation of the method steps of an embodiment example of a method for producing a multilayer film according to FIG. 1.

In the production of the multilayer film 1, which is represented stepwise in FIG. 3, a base body 17 is first provided which comprises at least the carrier ply 11, detachment layer 12 and protective varnish layer 13. One or more layers of the decorative ply 14 can also be integrated into the base body 17.

An adhesive layer 18 is then partially applied to a surface of the base body 17 facing away from the carrier ply 11. This preferably forms a motif or design in which the transfer ply 26 of the stamping foil 2 consisting of protective varnish 23, metal layer 24 and primer 25 is to be applied.

Figure 4:
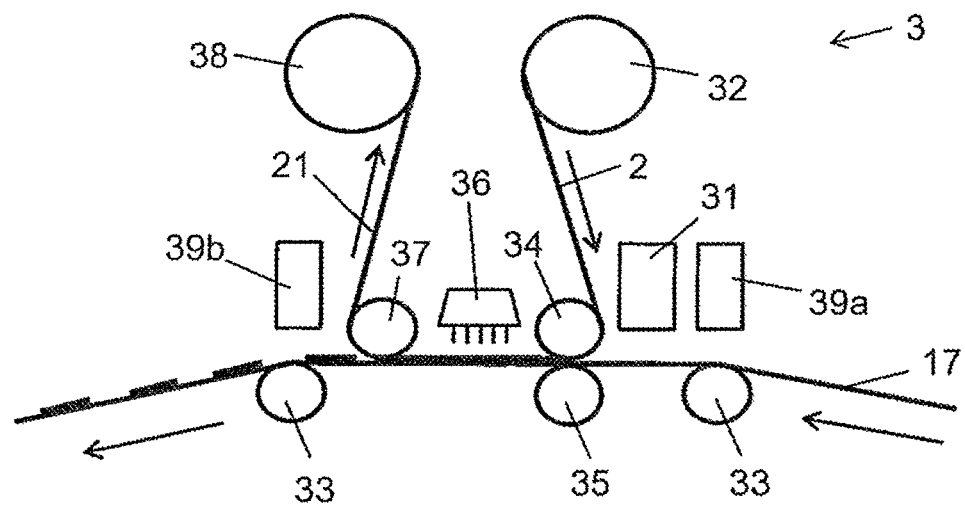
FIG. 4 a schematic representation of an embodiment example of a device for producing a multilayer film according to FIG. 1.

The depositing of the adhesive layer is effected in a device 3 according to FIG. 4 by means of an inkjet printhead 31.

The inkjet printhead 31 is preferably formed as a piezo drop-on-demand printhead. The printhead 31 must have a particular physical resolution, droplet size and nozzle spacing for high-quality results.

The nozzles can be arranged in one or more rows. The physical resolution should be 300 npi to 1200 npi (nozzles per inch). A small nozzle spacing transverse to the printing direction ensures that the printed pixels likewise lie close to each other transverse to the printing direction or overlap depending on the quantity of adhesive. As a rule, the npi corresponds to the dpi (dots per inch) on the printed film.

The nozzle spacing should preferably be 50 µm to 150 µm, in the case of a preferred nozzle diameter of from 15 µm to 25 µm with in each case a tolerance of ±5 µm, in order that constant results are generated.

When grayscale technology is used, several shades of gray can be generated on the same pixel. The shades of gray are, as a rule, generated by firing several identically sized droplets onto a printed pixel. The quantity of adhesive on the base body 17 behaves analogously to the shades of gray during the printing of printing inks.

The quantity of adhesive must be varied depending on the absorbency of the surface of the base body 17. The quantity of adhesive on the film should preferably be 1.2 g/m$^2$ to 12.6 g/m$^2$, in order to guarantee a complete film application to each substrate 4. The layer thicknesses of the deposited adhesive are then 1.205 µm to 12.655 µm.

For an optimum wetting of the base body 17 with adhesive 18, the surface thereof should have a surface tension of from 38 mN/m to 46 mN/m, in particular the range of from 41 mN/n to 43 mN/m ensures an optimum ink trapping.

In order to guarantee a high resolution in the printing direction, the piezo actuator of the inkjet printhead 31 must fire the adhesive droplets with a frequency of from 6 kHz to 110 kHz, which generates a resolution on the film 2 of from 360 dpi to 1200 dpi for printing substrate speeds (thus conveying speeds of the base body 17) of from 10 m/min to 30 m/min.

The pressure inside the nozzle chamber of the inkjet printhead 31 at the time of the release of the droplets is preferably 1 bar to 1.5 bar and must not be exceeded, in order not to damage the piezo actuator. In the remaining time, a slight negative pressure of from approximately −5 to −25 mbar prevails at the nozzle openings, in order to prevent an undesired escape of ink.

The spacing of the nozzle plate of the inkjet printhead 31 from the base body 17 must not exceed 1 mm, in order to minimize the deflection of the fine adhesive droplets due to a draft.

The droplet volume should preferably be 2 pl to 50 pl, the tolerance is ±6% of the droplet volume. In the case of a given resolution, the necessary and a uniform quantity of adhesive on the base body 17 is thus achieved.

The droplet speed in flight should preferably be 5 m/s to 10 m/s±15%, in order that all adhesive droplets land on the base body 17 very precisely next to each other. If the droplet speeds of the individual droplets deviate from each other too greatly, this becomes visible through a disturbed printed image.

The resulting pixel size is dependent on the viscosity of the adhesive. For an optimum printability of the adhesive, the viscosity thereof should preferably be 5 mPas to 20 mPas, particularly preferably 10 mPas to 15 mPas.

In order to guarantee a constant viscosity of the adhesive, the inkjet printhead 31 or the adhesive supply system must be heated. For the named viscosity, the adhesive temperature in operation must be 40° C. to 45° C.

Through the droplet flight and the striking of the base body 17 the viscosity of the adhesive droplets increases due to cooling, probably to from 20 mPas to 50 mPas. Such an increase in the viscosity counteracts a running or spreading of the adhesive on the base body 17.

The stamping foil 2 is then provided by a supply roll 32. Base body 17 and stamping foil 2 are guided through deflection rollers 33 such that they run parallel to each other, wherein the respective surfaces facing away from the carrier plies 11, 21 face each other. By means of a stamping roller 34 and a counter-pressure roller 35, the stamping foil 2 is now pressed onto the base body 17.

The stamping roller 34 should consist of a solid plastic or rubber with a smooth surface and preferably have a hardness of from 70° Shore A to 90° Shore A.

The counter-pressure roller 35 is preferably formed from a material which has a hardness grade in the range of from 60° Shore A to 95° Shore A, preferably in the range of from 80° Shore A to 95° Shore A and/or a hardness grade in the range of from 450 HV 10 (HV=Vickers hardness) to 520 HV 10, preferably in the range of from 465 HV 10 to 500 HV 10. For example, this material is plastic or silicone or else a metal such as aluminum or steel. The radius of the stamping roller 34 and the counter-pressure roller 35 should be from 1 cm to 3 cm.

The linear compression exerted by the stamping roller 34 should preferably be effected with a force between 10 N and 80 N, which can be adapted depending on the nature of the substrate.

To adapt the contact pressure, stamping roller 34 and counter-pressure roller 35 can be pushed towards each other, with the result that the clearance between the rollers is adjustable.

The adhesive 18 is then fully cured by irradiation with a UV light source 36.

The light source 366 is preferably formed as a strong LED UV lamp, which provides a high irradiation power and ensures a complete radical chain reaction inside the adhesive.

The spacing of the UV light source 36 from the films is 1 mm to 2 mm, in order to achieve an optimum full cure, but at the same time avoid physical contact between the UV light source 36 and the stamping foil 2. The size of the irradiation window of the UV light source 36 should be 20 mm to 40 mm in the machine direction.

The gross UV irradiance should preferably lie between 12 $W/cm^2$ and 20 $W/cm^2$, in order that the full curing of the adhesive is completed at speeds of from 10 m/min to 30 m/min (or higher).

If these factors are taken into account, the adhesive in this method is Irradiated with a net UV irradiance of from preferably approximately 4.8 $W/cm^2$ to 8.0 $W/cm^2$. This corresponds to a net energy input (dose) in the case of a preferred irradiation time of between 0.112 s (at 10 m/min web speed and a 20-mm irradiation window) and 0.040 s (30 m/min; 20 mm) in the adhesive of from approximately 537 $mJ/cm^2$ to 896 $mJ/cm^2$, which can be varied depending on the required full cure.

It is to be noted that these values are only theoretically possible (at 100% lamp power). At full power of the second UV light source 17, e.g. in the case of the 20 $W/cm^2$ version, and a low web speed, e.g. 10 m/min, the film web heats up so strongly that it can catch fire. The net energy input therefore preferably lies between 200 $mJ/cm^2$ and 400 $mJ/cm^2$ depending on the web speed.

After the full cure, the stamping foil 2 adheres completely to the adhesive 18 and the adhesive 18 adheres completely to the base body 17. The carrier ply 21 of the stamping foil can now be removed via a removal roller 37 and wound onto a spool 38. The transfer ply 26 of the stamping foil 2 with the metal layer 24 now remains only in the areas on the base body 17 covered with adhesive, with the result that the desired design results.

The device 3 furthermore has two more line scan cameras 39a, 39b. The camera 39a is positioned at the inlet of the device and detects optical features of the base body 17, such as for example existing design elements or register marks. With the aid of this detection, the printhead 31 is actuated, with the result that the adhesive pattern is applied register-accurate relative to these features.

The camera 39b is located at the outlet of the device 3 and detects the quality of the depositing of the stamping foil 2.

Figure 5:
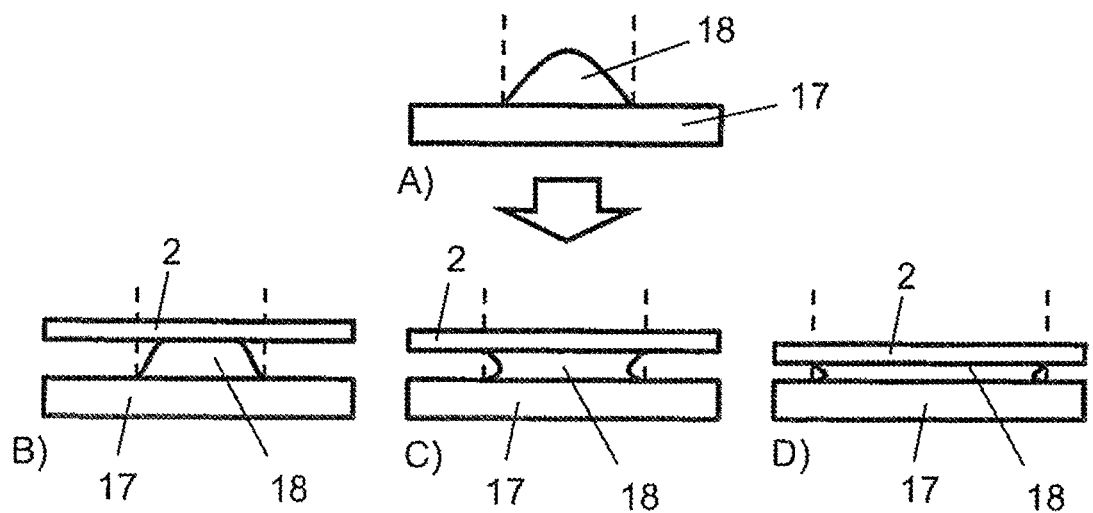
FIG. 5 a schematic representation of the dependence between clearance of the stamping rollers and pixel size of the transferred adhesive.

The clearance between the rollers 34, 35, and thus the contact pressure, is particularly important. As illustrated in FIG. 5, an adhesive droplet with a given diameter is deposited (FIG. 5A). If the clearance is too large, the adhesive droplet is not sufficiently pinched and the resulting pixel is too small (FIG. 5B). If the clearance Is too small, the adhesive droplets pinch too much, resulting in pixels that are too large (FIG. 5D). The desired pixel size is only achieved if the clearance is correct (FIG. 5C).

Using the camera 39b the resulting pixel size can be measured and in the event of deviations from the target measurement the clearance can be set by adjustment of the rollers 34, 35, with the result that a constantly good print quality is always achieved.

Figure 6:
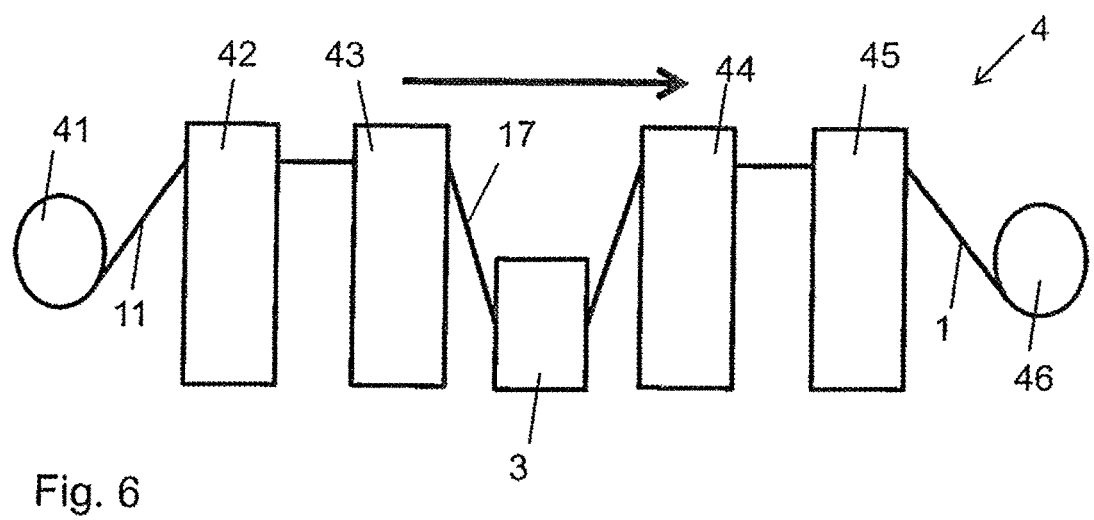
FIG. 6 a schematic representation of the integration of a device according to FIG. 4 into a printing line.

As FIG. 6 shows, the device 3 can be integrated into a printing line 4, with the result that the depositing of the stamping foil 2 on the base body 17 can be carried out inline with further printing processes. The carrier ply 11 of the base body 17 is provided by a first spool 41 and provided with the coatings which make up the base body 17 in first printing units 42, 43.

Then, in the device 3, as described, the depositing of the stamping foil 2 is effected, with the result that the decorative layer 14 of the multilayer film 1 is at least partially constructed. Further layers can be deposited on the stamped base body 17 in the printing units 44, 45 placed downstream, in order thus to obtain the finished multilayer film 1, which Is then spooled onto a further spool 46.

Figure 7:
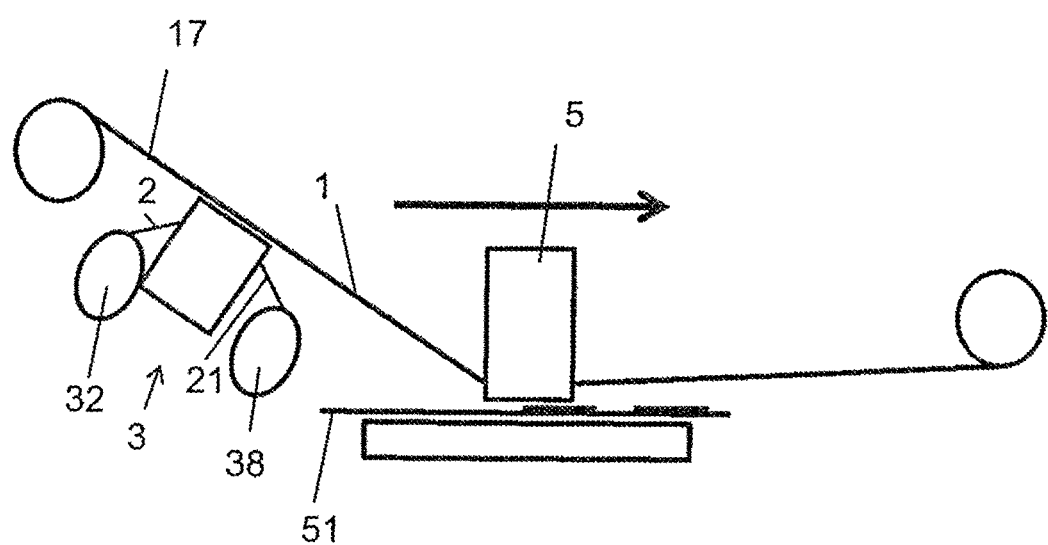
FIG. 7 a schematic representation of the integration of a device according to FIG. 4 during the application of the multilayer film to a substrate.

As FIG. 7 shows, the device 3 can be arranged shortly before or during the application of the multilayer film 1 to a substrate 51. The base body 17 is preferably provided by a spool. However, it is also conceivable that only the carrier ply of the base body is provided by the spool and, between the spool and the device 3, more printing units are arranged which provide the carrier ply of the base body with further layers, such as for example decorative layers and/or protective layers.

Then, in the device 3—as already described—the depositing of the stamping foil 2 on the base body 17 is effected. After the multilayer film 1 has been produced, the multilayer film 1 is conveyed to an application device or stamping device 5. In the application device 5, the multilayer film 1 is applied to a substrate 51 at least in areas.

Advantageously, between the device 3 and the application device 5, at least one further device for depositing a further stamping foil 2 is arranged. The multilayer film 1 can hereby be adapted individually to the customers' requirements. It is also conceivable that a device 3, in particular a further device 3, is arranged downstream of the application device 5.

LIST OF REFERENCE NUMBERS 1 multilayer film
11 carrier ply
12 detachment layer
13 protective varnish layer
14 decorative ply
15 varnish layer
16 primer
17 base body
18 adhesive
2 cold-stamping foil
21 carrier ply
22 detachment layer
23 protective varnish layer
24 metal layer 25 primer layer
26 transfer ply
3 device
31 inkjet printhead
32 supply roll
33 deflection roller
34 stamping roller
35 counter-pressure roller
36 UV light source
37 removal roller
38 spool
39a,b line scan camera
4 printing line
41 first spool
42, 43 first printing units
44, 45 printing units placed downstream
46 further spool
5 application device
51 substrate

The invention claimed is:

1. A method for producing a decoration on a substrate using a multilayer transfer film, the method comprising:
   a) providing a base body with a carrier ply and a transfer ply, the base body further comprising at least a detachment layer between the carrier ply and the transfer ply for detaching the carrier ply of the base body from other layers of the transfer film after application of the transfer film to the substrate;
   b) applying a UV curable adhesive to at least one first partial area of the transfer ply of the base body, wherein no adhesive is applied in at least one second partial area of the transfer ply;
   c) applying a stamping foil which comprises a carrier ply and a transfer ply, with the result that the transfer ply of the stamping foil comes into contact with the adhesive deposited on the transfer ply of the base body in the at least one first partial area;
   d) curing the adhesive by UV irradiation;
   e) removing the carrier ply of the stamping foil from the base body, whereby portions of the transfer ply of the stamping foil remains on the base body only where the adhesive is applied, the base body and the portions of the transfer ply of the stamping foil remaining on the base body forming the multilayer transfer film;
   f) providing the substrate;
   g) applying an adhesive to at least one of the multilayer transfer film or the substrate;
   h) applying the multilayer transfer film to the substrate;
   i) removing the carrier ply of the base body from the multilayer transfer film leaving the transfer ply of the base body and the portions of the transfer ply of the stamping foil remaining on the base body on the substrate to form the decoration on the substrate,
   wherein a base body and a stamping foil are used which are formed such that a detachment force between the carrier ply of the stamping foil and the transfer ply of the stamping foil is lower than a detachment force between the carrier ply of the base body and the transfer ply of the base body, and
   wherein the detachment force of the carrier ply of the stamping foil and the transfer ply of the stamping foil is at least 15% lower than between the carrier ply of the base body and the transfer ply of the base body.

2. The method according to claim 1, wherein the adhesive is applied by screen printing or flexography.

3. The method according to claim 1, wherein the adhesive is applied by inkjet printing.

4. The method according to claim 3, wherein, for the application of the adhesive, an inkjet printhead with a resolution of from 300 to 1200 nozzles per inch (npi) is used.

5. The method according to claim 3, wherein, for the application of the adhesive, an inkjet printhead with a nozzle diameter of from 15 μm to 25 μm with a tolerance of no more than ±5 μm.

6. The method according to claim 3, wherein the adhesive is applied to the at least one partial area with a weight per unit area of from 0.5 g/m² to 20 g/m².

7. The method according to claim 3, wherein adhesive droplets are provided by the inkjet printhead with a frequency of from 6 kHz to 110 kHz.

8. The method according to claim 3, wherein adhesive droplets with a volume of from 2 picoliter to 50 picoliter with a tolerance of no more than ±6% are provided by the inkjet printhead.

9. The method according to claim 3, wherein adhesive droplets are provided by the inkjet printhead with a flight speed of from 5 m/s to 10 m/s with a tolerance of no more than ±15%.

10. The method according to claim 3, wherein the adhesive is deposited on the transfer ply of the base body with a depositing temperature of from 40° C. to 45° C.

11. The method according to claim 3, wherein a spacing between inkjet printhead and base body does not exceed 1 mm during the application of the adhesive.

12. The method according to claim 3, wherein a relative speed between inkjet printhead and base body during the application of the adhesive is 10 m/min to 30 m/min.

13. The method according to claim 3, wherein an adhesive with the following composition by volume is used:

| | |
|---|---|
| 2-phenoxyethyl acrylate | 10% to 60%; |
| 4-(1-oxo-2-propenyl)morpholine | 5% to 40%, |
| exo-1,7,7-trimethylbicyclo[2.2.1]-hept-2-yl acrylate | 10% to 40%; |
| 2,4,6-trimethylbenzoyldiphenyl phosphine oxide | 5% to 35%; |
| dipropylene glycol diacrylate | 1% to 20%; |
| urethane acrylate oligomer | 1% to 20%. |

14. The method according to claim 3, wherein an adhesive with a density of from 1 g/ml to 1.5 g/ml is used.

15. The method according to claim 1, wherein the adhesive is applied in the form of an item of optically perceptible information.

16. The method according to claim 1, wherein the adhesive is applied in a predefined positional relationship to a further item of optically perceptible information which is formed by the transfer ply of the base body.

17. The method according to claim 16, wherein a position of the further item of optically perceptible information is detected before the application of the adhesive by means of a line scan camera, and the adhesive depositing is controlled depending on the detected position.

18. The method according to claim 1, wherein the adhesive is pre-cured before the application of the stamping foil.

19. The method according to claim 18, wherein the pre-curing of the adhesive is effected 0.02 s to 0.025 s after the application of the adhesive.

20. The method according to claim 18, wherein the pre-curing of the adhesive is effected with UV light, the energy of which is at least 90% radiated in the wavelength range between 380 nm and 420 nm.

21. The method according to claim 18, wherein the pre-curing of the adhesive is effected with a gross irradiance of from 2 W/cm² to 5 W/cm².

22. The method according to claim 18, wherein the pre-curing of the adhesive is effected with an illumination time of from 0.02 s to 0.056 s.

23. The method according to claim 18, wherein, during the pre-curing of the adhesive, the viscosity thereof increases to from 50 mPas to 200 mPas.

24. The method according to claim 1, wherein the application of the stamping foil to the base body is effected between a pressure roller and a counter-pressure roller.

25. The method according to claim 1, wherein the application of the stamping foil to the base body is effected with a contact pressure of from 10 N to 80 N.

26. The method according to claim 1, wherein the application of the stamping foil to the base body is effected 0.2 s to 1.7 s after the pre-curing of the adhesive.

27. The method according to claim 1, wherein the curing of the adhesive is effected 0.2 s to 1.7 s after the application of the stamping foil.

28. The method according to claim 1, wherein the curing of the adhesive is effected with UV light, the energy of which is at least 90% radiated in the wavelength range between 380 nm and 420 nm.

29. The method according to claim 1, wherein the curing of the adhesive is effected with a gross irradiance of from 12 W/cm² to 20 W/cm².

30. The method according to claim 1, wherein the curing of the adhesive is effected with an illumination time of from 0.04 s to 0.112 s.

31. The method according to claim 1, wherein the removing of the carrier ply of the stamping foil is effected 0.2 s to 1.7 s after the curing of the adhesive.

32. The method according to claim 1, wherein the carrier ply of the base body is made of polyester, polyolefin, polyvinyl, polyimide, ABS, PET, PP, PE, PVC or PS with a layer thickness of from 3 µm to 100 µm.

33. The method according to claim 1, wherein the transfer ply of the base body has a detachment layer made of one or more of the following materials: acrylate copolymer; and silicone, with a layer thickness of from 0.01 µm to 2 µm, which is arranged on a surface of the carrier ply of the base body.

34. The method according to claim 1, wherein the transfer ply of the base body has a varnish layer made of one or more of the following materials: nitrocellulose; polyacrylate; and polyurethane copolymer with a layer thickness of from 0.1 µm to 5 µm, and with at least one colorant.

35. The method according to claim 1, wherein the transfer ply of the base body comprises at least one replication layer, into which a surface relief is introduced which forms an optically variable element.

36. The method according to claim 1, wherein the transfer ply of the base body has a metal layer made of one or more of the following materials: aluminum; chromium; silver; gold; and copper with a layer thickness of from 10 nm to 200 nm, which is arranged on a surface of the varnish layer facing away from the carrier ply of the base body.

37. The method according to claim 1, wherein the transfer ply of the base body has a primer layer made of one or more of the following materials: polyacrylates; and vinyl acetate copolymers with a layer thickness of from 0.1 µm to 1.5 µm, which forms a surface of the transfer ply of the base body facing away from the carrier ply of the base body.

38. The method according to claim 37, wherein the primer layer is microporous and has a surface tension of from 38 mN/m to 46 mN/m.

39. The method according to claim 1, wherein the UV curable adhesive is printed onto the transfer ply of the base body, and wherein the stamping foil is applied to the adhesive after it is printed onto the transfer ply of the base body.

40. The method according to claim 3, wherein, for the application of the adhesive, an inkjet printhead with a nozzle spacing of from 50 µm to 150 µm with a tolerance of no more than ±5 µm is used.

41. The method according to claim 3, wherein the adhesive is applied to the at least one partial area with a layer thickness of from 0.5 µm to 20 µm.

42. The method according to claim 3, wherein the adhesive is deposited on the transfer ply of the base body with a viscosity of from 5 mPas to 20 mPas.

43. The method according to claim 18, wherein the pre-curing of the adhesive is effected with a net irradiance of from 0.7 W/cm² to 2 W/cm².

44. The method according to claim 18, wherein the pre-curing of the adhesive is effected with an energy input into the adhesive of from 8 mJ/cm² to 112 mJ/cm².

45. The method according to claim 1, wherein the curing of the adhesive is effected with a net irradiance of from 4.8 W/cm² to 8 W/cm².

46. The method according to claim 1, wherein the curing of the adhesive is effected with an energy input into the adhesive of from 200 mJ/cm² to 900 mJ/cm².

47. The method according to claim 1, wherein the carrier ply of the stamping foil is made of polyester, polyolefin, polyvinyl, polyimide, ABS, PET, PP, PE, PVC or PS with a layer thickness of from 3 µm to 100 µm.

48. The method according to claim 1, wherein the transfer ply of the stamping foil has a detachment layer made of at least one of an acrylate copolymer and silicone, with a layer thickness of from 0.01 µm to 2 µm, which is arranged on a surface of the carrier ply of the stamping foil.

49. The method according to claim 1, wherein the transfer ply of the stamping foil has a varnish layer made of one or more of the following materials: nitrocellulose; polyacrylate; and polyurethane copolymer with a layer thickness of from 0.1 µm to 5 µm, and with at least one colorant.

50. The method according to claim 1, wherein the transfer ply of the stamping foil comprises at least one replication layer, into which a surface relief is introduced which forms an optically variable element.

51. The method according to claim 1, wherein the transfer ply of the stamping foil has a metal layer made of one or more of the following materials: aluminum; chromium; silver; gold; and copper with a layer thickness of from 10 nm to 200 nm, which is arranged on a surface of the varnish layer of the stamping foil facing away from the carrier ply of the stamping foil.

52. The method according to claim 1, wherein the transfer ply of the stamping foil which has a primer layer made of one or more of the following materials: polyacrylates; and vinyl acetate copolymers with a layer thickness of from 0.1 µm to 1.5 µm, which forms a surface of the transfer ply of the stamping foil facing away from the carrier ply of the stamping foil.

53. A method for producing a decoration on a substrate using a transfer film, the method comprising:
   a) providing a base body with a carrier ply and a transfer ply, the base body further comprising at least a detachment layer between the carrier ply and the transfer ply for detaching the carrier ply of the base body from other layers of the transfer film after application of the transfer film to the substrate;

b) applying a UV curable adhesive to at least one first partial area of the transfer ply of the base body, wherein no adhesive is applied in at least one second partial area of the transfer ply;

c) applying a stamping foil which comprises a carrier ply and a transfer ply, with the result that the transfer ply of the stamping foil comes into contact with the adhesive deposited on the transfer ply of the base body in the at least one first partial area;

d) curing the adhesive by UV irradiation;

e) removing the carrier ply of the stamping foil from the base body, whereby portions of the transfer ply of the stamping foil remains on the base body only where the adhesive is applied, the base body and the portions of the transfer ply of the stamping foil remaining on the base body forming the multilayer transfer film;

f) providing the substrate;

g) applying an adhesive to at least one of the multilayer transfer film or the substrate;

h) applying the multilayer transfer film to the substrate; and i) removing the carrier ply of the base body from the multilayer transfer film leaving the transfer ply of the base body and the portions of the transfer ply of the stamping foil remaining on the base body on the substrate to form the decoration on the substrate, wherein the adhesive is applied by inkjet printing, and wherein, for the application of the adhesive, an inkjet printhead with a resolution of from 300 to 1200 nozzles per inch (npi) is used.

54. The method according to claim 53, wherein a base body and a stamping foil are used which are formed such that a detachment force between the carrier ply of the stamping foil and the transfer ply of the stamping foil is lower than a detachment force between the carrier ply of the base body and the transfer ply of the base body wherein the detachment force of the carrier ply of the stamping foil and the transfer ply of the stamping foil is at least 15% lower than between the carrier ply of the base body and the transfer ply of the base body.

55. A method for producing a decoration on a substrate using a transfer film, the method comprising:

a) providing a base body with a carrier ply and a transfer ply, the base body further comprising at least a detachment layer between the carrier ply and the transfer ply for detaching the carrier ply of the base body from other layers of the transfer film after application of the transfer film to the substrate;

b) applying a UV curable adhesive to at least one first partial area of the transfer ply of the base body, wherein no adhesive is applied in at least one second partial area of the transfer ply;

c) applying a stamping foil which comprises a carrier ply and a transfer ply, with the result that the transfer ply of the stamping foil comes into contact with the adhesive deposited on the transfer ply of the base body in the at least one first partial area;

d) curing the adhesive by UV irradiation;

e) removing the carrier ply of the stamping foil from the base body, whereby portions of the transfer ply of the stamping foil remains on the base body only where the adhesive is applied, the base body and the portions of the transfer ply of the stamping foil remaining on the base body forming the multilayer transfer film;

f) providing the substrate;

g) applying an adhesive to at least one of the multilayer transfer film or the substrate;

h) applying the multilayer transfer film to the substrate; and i) removing the carrier ply of the base body from the multilayer transfer film leaving the transfer ply of the base body and the portions of the transfer ply of the stamping foil remaining on the base body on the substrate to form the decoration on the substrate, wherein the adhesive is applied by inkjet printing, and wherein adhesive droplets with a volume of from 2 picoliter to 50 picoliter with a tolerance of no more than ±6% are provided by the inkjet printhead.

* * * * *